United States Patent
Dalmazzone et al.

(10) Patent No.: US 6,571,604 B2
(45) Date of Patent: Jun. 3, 2003

(54) METHOD AND DEVICE FOR EVALUATING DURING DRILLING THE CAPACITY OF WELL FLUIDS TO FORM HYDRATES

(75) Inventors: Christine Dalmazzone, Versailles (FR); Benjamin Herzhaft, Suresnes (FR); Annie Audibert, Croissy sur Seine (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 10/066,644

(22) Filed: Feb. 6, 2002

(65) Prior Publication Data

US 2002/0134136 A1 Sep. 26, 2002

(30) Foreign Application Priority Data

Feb. 9, 2001 (FR) ............................................. 01 01771

(51) Int. Cl.$^7$ ............................. G01N 25/00; C01B 3/32
(52) U.S. Cl. ...................................... 73/25.01; 48/127.5
(58) Field of Search ............................. 73/25.01, 31.06; 48/127.5; 514/300, 266.4; 510/224; 585/3

(56) References Cited

U.S. PATENT DOCUMENTS

| | | | | |
|---|---|---|---|---|
| 5,660,603 A | * | 8/1997 | Elliot et al. ................. | 48/127.5 |
| 5,962,468 A | * | 10/1999 | Hong et al. ................. | 514/300 |
| 6,017,921 A | * | 1/2000 | Kennedy et al. .......... | 514/266.4 |
| 6,177,392 B1 | * | 1/2001 | Lentsch et al. ............. | 510/224 |
| 6,258,765 B1 | * | 7/2001 | Wei et al. .................... | 510/224 |
| 6,417,415 B1 | * | 7/2002 | Sakaguchi et al. .......... | 585/3 |

OTHER PUBLICATIONS

Introducing the PYRIS Diamond DSC, author unknown, date unknown.*
Rheometric Scientific, Differential Scanning Calorimeter DSC, Jan 1997, author unknown.*
NIST, Micron Scale Differential Scanning Calorimeter, 6,4, 1998, author unknown.*

* cited by examiner

*Primary Examiner*—Helen Kwok
*Assistant Examiner*—Jay L. Politzer
(74) *Attorney, Agent, or Firm*—Antonelli, Terry, Stout & Kraus, LLP

(57) ABSTRACT

Method of determining the gas hydrate formation conditions in a well fluid, comprising the following stages:
  taking a fluid sample,
  placing this sample in a calorimetry cell,
  performing on this sample a reference thermogram in a temperature range between T1 and T2,
  performing on the same sample a second thermogram in the same range and under a pressure Ph of a hydrocarbon gas, T1 being a temperature low enough to obtain the formation of hydrates in the sample at a gas pressure Ph, T2 being high enough to obtain hydrate dissociation,
identifying a peak in the second thermogram corresponding to the hydrates dissociation zone and deducting therefrom a hydrates dissociation temperature.

7 Claims, 3 Drawing Sheets

FIG.1
FIG.2
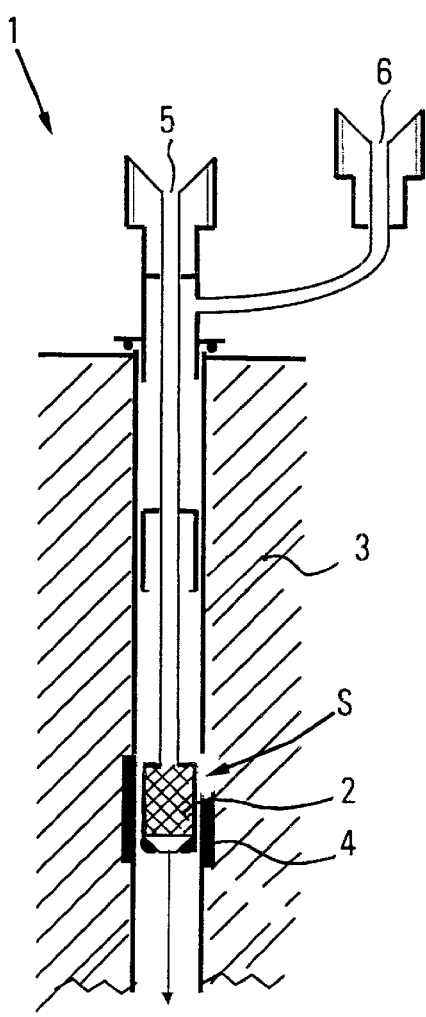
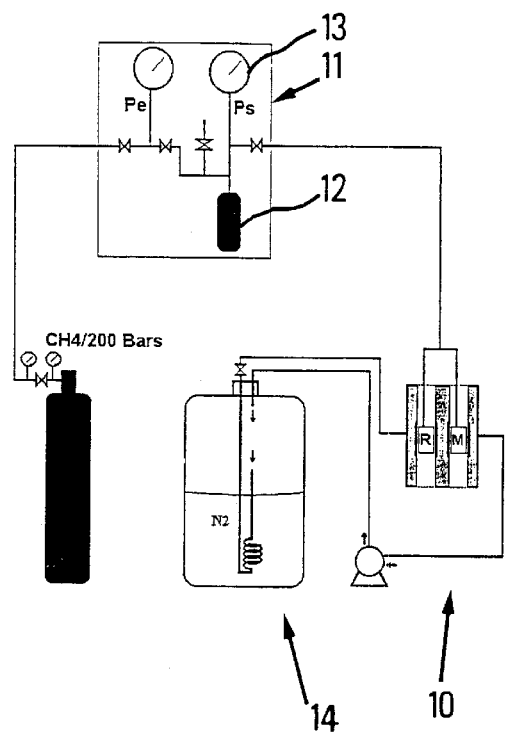

METHOD AND DEVICE FOR EVALUATING DURING DRILLING THE CAPACITY OF WELL FLUIDS TO FORM HYDRATES

FIELD OF THE INVENTION

The present invention relates to the field of drilling operations, in particular deep offshore and very deep offshore drilling. These operations generate increasingly complex technical problems considering the extreme conditions encountered at such water depths. It is for example possible to observe temperatures close to 0° C. and pressures close to 400 bars at the water bottom (mud line). As a consequence, the drilling fluid circulating in the well, subjected to these conditions, must keep its properties within a very wide temperature range, for example between 0° C. and 200° C.

The above-mentioned bottomhole temperature and pressure conditions are particularly favourable to the formation of gas hydrates. Gas hydrates are solid structures containing water and gas. The water contained in the drilling fluids forms, under certain temperature and pressure conditions that essentially depend on the composition of the aqueous phase, a solid cage which traps the gas molecules. Formation of these solid gas hydrates can have particularly serious consequences as a result of the agglomeration and deposition of hydrate crystals that may eventually clog the wellhead, the auxiliary control lines and the annulus.

The loss of the rheological properties of the mud (due to the breaking of the water-in-oil emulsion by the hydrate crystals in the case of inverted oil-emulsion muds, and to the growth of the crystals in the case of water-base muds) can lead to an interruption of the drilling operations or even to the loss of the well, not to mention the safety problems linked with the dissociation of the hydrates formed (high-velocity propulsion of solid hydrate slugs). Furthermore, during mud backflow to the surface, large amounts of gas can be released at the surface.

BACKGROUND OF THE INVENTION

The operational solutions conventionally used by operators consist in using water-base or oil-base muds comprising thermodynamic hydrate formation inhibitors. The most commonly used inhibitors are salts and glycols, used in high proportions (conventionally 20 to 30% salt concentrations), which entails considerable corrosion and toxicity or logistic problems.

Determination of the pressure/temperature zones where gas hydrates are likely to form in the drilling mud (thermodynamic conditions of use) is currently based on tests carried out in reactors on aqueous solutions (simplified or model formulations) or on thermodynamic models validated from PVT cell experiments on simple or model fluids. The action of inhibitor additives is generally tested on model hydrates (THF or freon) allowing to work safely at the atmospheric pressure.

At the present time, there is no simple, fast and reliable method for determining the conditions of gas hydrate formation in drilling fluids that could be directly applicable in the field, at temperatures close to 0° C. and under natural gas pressure. The importance of working on real muds, i.e. mud samples taken at the surface, is particularly linked with the influence of the constituents, notably the solids, whose action on the formation of hydrates cannot be quantified a priori.

The existing techniques for determining the hydrate dissociation points in drilling muds use measurements in PVT cells or in reactors, and they follow the gas consumption and the pressure variation (at constant volume). The drawbacks of these techniques are linked with the implementation weightiness (long experiment time) and with the difficulty in working with complex fluids, particularly those containing solids.

Practically any physico-chemical phenomenon characterized by an enthalpy change (chemical reaction, transition, fusion . . . ) can be characterized by DSC (Differential Scanning Calorimetry). However, application of this technique to the characterization of hydrates has been limited to model hydrates that can form at atmospheric pressure.

Handa's published work (Handa, Y. P., (1986a), Compositions, enthalpies of dissociation and heat capacities in the range 85 to 270 K for clathrate hydrates of methane, ethane, propane, and enthalpy of dissociation of isobutane hydrate, as determined by a heat-flow calorimeter, J. Chem. Thermodynamics, 18, 915–921. Handa, Y. P., (1986b), Calorimetric studies of laboratory synthesized and naturally occuring gas hydrates, in Proc. AIChE Annual Meeting, Miami Beach, Nov. 2–7, Handa, Y. P., (1988), A calorimetric study of naturally occuring gas hydrates, Ind. Eng. Chem. Res., 27, 872–874) is well-known. He has developed a calorimetric technique for determining the compositions, enthalpies of dissociation and specific heats of xenon, krypton, methane, propane, ethane and isobutane hydrates, as well as natural gas hydrate samples. He has used, for this study, a SETARAM BT Calvet type calorimeter allowing to work on samples of several grams, which of course reduces the usable temperature scanning speed range (because of thermal transfer problems in the sample), but allows very precise enthalpy and thermal property measurements.

Koh et al. (1998) of King's College in London (Koh, C. A., Westacott, R. E., Hirachand, K., Zugic, M., Zhang, W., Savidge, J. L., (1998), Low dosage natural gas hydrate inhibitor evaluation, in Proc. 1998 Intern. Gas Research Conference, San Diego, USA, November 8–11, Vol. I, 194–200) have recently used the DSC technique to test hydrate inhibitors. Since their device does not work under pressure, they have studied model THF hydrates that form at atmospheric pressure. They used cooling and temperature scanning to determine the supercooling degrees according to the inhibitor type and also carried out studies under isothermal conditions after fast quenching of the sample to observe the crystallization of the THF hydrates as a function of time. They have thus been able to draw curves referred to as THF (time-temperature-transformation) curves which allow to compare the kinetic effect of the inhibitors on the formation of hydrates.

Fouconnier et al. (1999), of the University of Compiègne (Fouconnier, B., Legrand, V., Komunjer, L., Clausse, D., Bergflodt, L., Sjöblom, J., (1999), Formation of trichlorofluoromethane hydrate in w/o emulsions studied by DSC, Progr. Colloid Polym. Sci., 112, 105–108) have used the DSC technique at atmospheric pressure to study the formation of model trichlorofluoromethane hydrates in water-in-oil emulsions stabilized by Berol 26. The formation of hydrates has been observed by means of the DSC technique with temperature scanning.

SUMMARY OF THE INVENTION

The object of the present invention is to have, on a drilling site (in mud logging and monitoring cabs), a device for determining risks of hydrate formation on a real well fluid, by measuring the hydrate dissociation temperature at a given gas pressure, according to the DSC (Differential Scanning Calorimetry) technique. These measurements allow the operator to predict dangerous zones with hydrate formation Pressure/Temperature conditions, and therefore to select the mud that is best suited to the current or future drilling conditions, or even to carry out in-situ tests on hydrate inhibitor additives under conditions that are very close to the real conditions. In the case of oil-base muds, which are inverted water-in-oil emulsions, it is also possible to determine whether hydrate formation is likely to break the emulsion, in which case the fluid loses its rheological properties. The combined use of a software allowing to determine the thermal profile in the mud during drilling allows the risks of hydrate formation during the operation to be precisely determined.

The present invention thus relates to a method for determining the gas hydrate formation conditions in a well fluid, said method comprising the following stages:

taking a fluid sample, placing this sample in a calorimetry cell, performing on this sample a reference thermogram in a temperature range between T1 and T2, performing on the same sample a second thermogram in the same range and under a pressure Ph of a hydrocarbon gas, T1 being a temperature low enough to obtain the formation of hydrates in the sample at a gas pressure Ph, T2 being high enough to obtain hydrate dissociation, identifying a peak in the second thermogram corresponding to the hydrates dissociation zone and deducing therefrom a hydrates dissociation temperature, determining the hydrate formation conditions for the fluid considered.

In a variant, pressure Ph can be determined as a function of the pressure of the well fluid close to the zones where the appearance of hydrates is critical.

The efficiency of anti-hydrate additives can be tested by adding them to said fluid sample in determined proportions.

T1 and T2 can be −20° C. and 35° C. respectively.

The measurements allowing to obtain the thermograms can be performed according to a scanning temperature gradient ranging between 0.5 and 5° C./minute, preferably 2° C./minute.

CH4 can be used for the sample saturation gas.

The present invention also relates to a system for implementing the method, characterized in that it comprises in combination: a calorimetric measuring device, means for placing the measuring cell of said device under pressure by means of a hydrocarbon gas, thermogram recording means.

BRIEF DESCRIPTION OF THE DRAWINGS

Other features and advantages of the present invention will be clear from reading the description hereafter of non limitative examples, with reference to the accompanying drawings wherein:

FIG. 1 illustrates the principle of the measuring cell of the device,

FIG. 2 illustrates the flowsheet of the device,

DETAILED DESCRIPTION

Figure 3A:
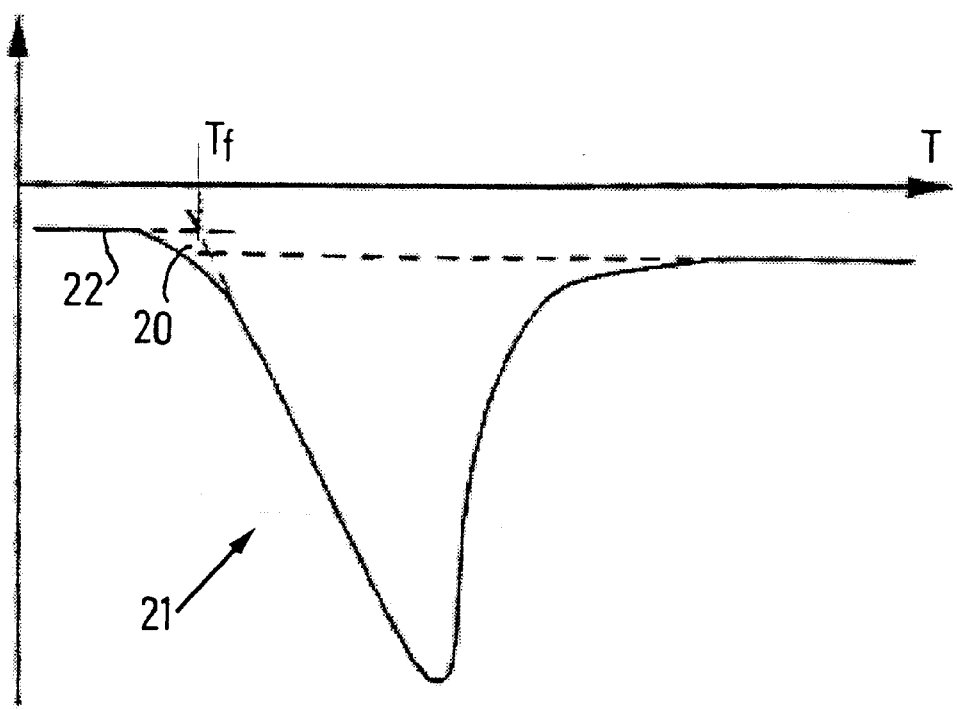
FIGS. 3a and 3b show examples of determination of the hydrates dissociation temperature.

DSC (Differential Scanning Calorimetry) or DEA (Differential Enthalpy Analysis) is a technique allowing to measure heat exchanges between a sample and a reference as a function of the temperature or of time. The record obtained from these measurements is referred to as thermogram There are several types of DSC devices which are commercially available. They work according to the principle described hereafter.

FIG. 1 diagrammatically shows a measuring device 1 wherein a fluid sample S is contained in a cup 2 that can be open or sealed and placed under pressure by means of a determined gas, according to the experimental conditions. A second cup (not shown), similar to the first one, can contain a reference sample or it can be left empty. Cups 2 are placed each in a shaft of oven 3 comprising thermostatic means allowing a temperature program to be applied. The various existing devices mainly differ in the thermal exchange measuring principle. In the simplest devices, a thermocouple is used to measure the temperature difference between the two cups at a point of the wall thereof (the bottom generally). The heat flow is deduced from this temperature difference by calibration.

More complex DSC devices use the Calvet principle to measure the heat exchanges very precisely. The principle of the device is diagrammatically shown in FIG. 1. The two cylindrical cups 2 are placed in two independent detectors 4 consisting of a series of thermocouples surrounding the cup. Each thermocouple measures the temperature difference between the cup and the oven, in the radial direction. This temperature difference is linked with the local heat flow $dq_{ii}/dt$ exchanged between the cup and the oven by:

$$e_i = \frac{\varepsilon}{\lambda} \frac{dq_i}{dt} \qquad (1)$$

where $e_i$ is the electric force released by couple i, $\varepsilon$ its thermoelectric constant and $\lambda$ the thermal conductivity of the material of the detector. All the couples are connected in such a way that the detector releases a total electric force E linked with the global thermal exchange dQ/dt by:

$$E = \sum_i e_i = \sum_i \frac{\varepsilon}{\lambda} \frac{dq_i}{dt} = \frac{\varepsilon}{\lambda} \frac{dQ}{dt} \qquad (2)$$

The differential measurement is performed by connecting the detectors of the reference and of the sample in opposition. The exact relation between the heat flow and the electric power recorded is obtained by calibration.

The base equation of this technique is as follows:

$$\frac{dh}{dt} = \frac{dq}{dt} + (C_e - C_r)\frac{dT_p}{dt} + RC_e \frac{d^2q}{dt^2} \qquad (3)$$

dh/dt=heat released or absorbed by the sample (W)
dq/dt=power recorded by the calorimeter (W)
$C_e$=heat-capacity rate of the sample (J/K)
$C_r$=heat-capacity rate of the reference (J/K)
$T_p$=temperature of the thermostatic block (K)
t=time (s)
R=thermal resistance (K/W).

The heat released by the sample is thus the sum of three terms: the first one represents the power recorded by the calorimeter, the second expresses the difference between the base line and the zero level of the signal, due to the specific heat differences between the sample and the reference, and the third represents the transient phenomena linked with the heat exchanges between the sample and the thermostatic block, R being the thermal resistance between the sample and the oven and $RC_e$ being the time constant of the cell containing the product. The heat released or absorbed by the sample is therefore directly linked with the power recorded by the calorimeter. A single calibration point therefore allows quantitative use of the thermograms throughout the temperature range available with the device.

The DSC technique can be used for three application types (Claudy, P., (1999), Analyse Calorimétrique Différentielle (DSC)—Application à la chimie. L'Actualité Chimique, Mars 1999, 13–22):

Thermodynamic: measurement of specific heats, transitions (transitions of the first order, fusion, crystallization, electric and magnetic transformations, glass transition . . . ), purity determination, study of disperse phases (thermoporosimetry, emulsions . . . );

Kinetic: various types of measurements can be performed from the relation between temperature, time and the degree of progress of a reaction (isothermal studies, kinetic measurements at constant or variable scanning speed). The order of a reaction and the activation energy can thus be determined;

Analytic: the calorimetric signal can be linked, in many cases, with the transformation of a particular compound. Measurement of the corresponding energy allows to determine the mass of the compound. The DSC technique is used for example to characterize silica in cements, polymorphous forms in pharmacy, various polymer forms, and it can also be readily applied to characterization of complex fluids such as gas oils, bitumen and crude oils.

The base line is the thermogram obtained in the absence of any thermal phenomenon. The shape of this base line entirely depends on the evolution of the heat-capacity rate of the cell containing the sample. In cases where a thermal phenomenon is accompanied by a specific heat variation of the sample, there will be a difference between the base lines obtained before and after the phenomenon considered.

Measurement of the area of the signal allows to directly return to the total heat involved during the thermal phenomenon. Study of the fusion of pure bodies whose specific fusion enthalpy is precisely known allows the calorimeter to be calibrated.

Unlike differential thermal analysis, the temperatures are not directly obtained with the DSC technique. Temperature calibration is carried out from the study of the fusion of pure bodies. The difference between the temperature of the sample $T_e$ and the programmed temperature $T_p$ is linked with the heating rate, the heat flow dQ/dt and the thermal properties of the cup and of the detector according to the following equation:

$$T_p - T_e = RC_e \frac{dT_p}{dt} - R\frac{dQ}{dt} \quad (4)$$

The gas hydrate dissociation temperature is determined as described hereafter. A calorimeter suited for work under controlled atmosphere and under pressure is preferably used, for example calorimeter DSC111 marketed by the SETARAM company (France), equipped with controlled-pressure cells. In FIG. 1, reference number 5 represents the junction with means for placing the sample under pressure by means of a hydrocarbon gas. Reference number 6 is a junction with well and cell sweeping means using an inert gas, nitrogen for example. This calorimeter is based on the Calvet principle described above and it is one of the most accurate devices. The oven can be readily cooled down to −120° C. by circulation of cold gaseous nitrogen.

FIG. 2 is the flowsheet of the device. DSC device 10 receives the two cells: M contains the sample to be tested and R contains the reference sample. In the present case, the reference cell is empty. A gas pressure is applied to the reference and measuring cells by means of a pressure control board 11 mainly consisting of a 0.4-liter surge drum 12 to compensate for all the pressure variations due to the consumption (or to the release) of gas during the formation (or the dissociation) of hydrates. The pressure is measured with a 0–100 bar precision pressure gage 13 having a 1-bar resolution. Each controlled-pressure cell consists of a cylindrical steel cup with a capacity of 0.27 ml, connected at each end to a thin steel tube ended by a connection, and sealed at the other end by a steel cap with an aluminium joint. Once positioned in the DSC detector, the cup is arranged exactly in the zone sensitive to heat flows, whereas the connection is outside the oven. Another connection is used for nitrogen sweeping during the analysis, in order to prevent condensation of the water at low temperature. The cup used as the reference cup is empty. 20 to 50 mg of the sample is fed into the measuring cup by means of a syringe.

The sample is first analysed at atmospheric pressure or under neutral gas pressure so as to obtain a <<blank>> or <<reference>> thermogram comprising all the thermal signals that cannot be imputed to the hydrates. The same analysis is then carried out under hydrocarbon gas pressure, a natural gas or other, the sample being cooled to a temperature that is low enough for the hydrate to form rapidly; the temperature has to be all the lower as the pressure is low. A cooling system using liquid nitrogen, shown by reference number 14 in FIG. 2, is for example used. The sample is then heated at a rate ranging between 0.5 and 5° C./min, preferably 2° C./min, to a temperature close to the ambient temperature (between 25 and 35° C.). The appearance of a peak in the zone where the record of the reference thermogram comprises none corresponds to the formation of hydrates. When in doubt (appearance of peaks in different zones), the test pressure can be varied, and the peak corresponding to the hydrates will then shift to temperatures that are all the higher as the pressure increases.

Figure 3B:
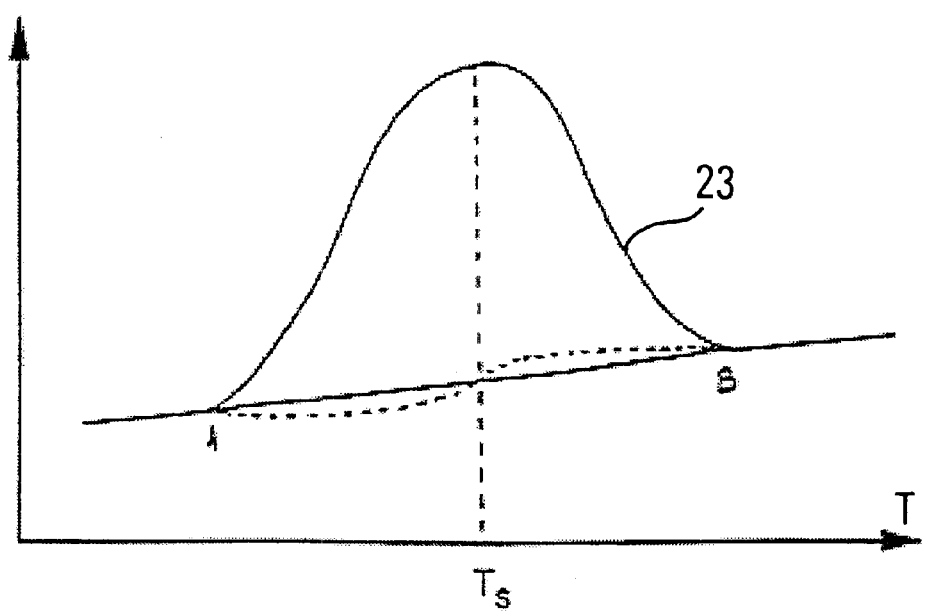

FIGS. 3a and 3b illustrate the determination of the hydrate dissociation temperature advantageously using calorimetric analysis techniques by identification of the thermal signal onset temperature $T_f$ which corresponds to the intersection between tangent 20 to the greatest slope of peak 21 and base line 22 (FIG. 3a). In the case of complex fluids (such as water-in-oil emulsions like oil-base muds), the peak may not be clearly defined. In this case, temperature $T_s$ corresponding to the vertex of peak 23 is preferably determined (FIG. 3b).

In the case of applications to a drilling site, in a mud logging cab for example, this type of calorimeter has to be made ADF. The cells are suited to withstand pressures close to 400 bars (extreme conditions encountered in deep offshore drilling) in order to perform measurements under conditions that are as close to reality as possible. These cells can be closed cells or gas-swept cells. The advantage of sweeping is to provide better diffusion of the gas in the sample by means of the agitation due to bubbling. It is therefore necessary to have a gas compression system to work at pressures above 150 bars.

The procedure consists in taking a well fluid sample from the mud backflow and to feed it into the measuring cell by means of a syringe (between 20 and 50 mg). The initial temperature of the calorimeter is preferably programmed at −20° C. at the most. Isotherm conditions are then established to ensure that equilibrium is reached, for example for 15 minutes at −20° C. A first temperature scan is carried out up to 20 to 30° C. under neutral gas (nitrogen) pressure or at the atmospheric pressure so as to obtain the reference thermogram. The scanning speed ranges between 0.5 and 5° C./min, preferably 2° C./min. The extreme pressure conditions encountered in the sensitive zone where hydrates are likely to form are recorded. After return to the initial temperature (−20° C. for example), the cells are placed under the hydrocarbon gas (natural gas or other) pressure representative of the conditions of the site (maximum 400 bars). The same analysis is repeated with temperature scanning, at the same heating rate, but under natural gas controlled pressure. The appearance of a peak in the zone where the reference thermogram comprises none is linked with the hydrate dissociation. The dissociation temperature is determined according to the technique described above (according to the peak type, onset temperature $T_f$ or vertex temperature $T_s$).

This procedure can be repeated at several different pressures according to the pressures representative of the site. The combined use of a predictive software for determining the thermal profile in the mud during drilling allows to precisely determine the time of the drilling operation when there is a risk of hydrate appearance in the circulating well fluid.

EXAMPLES

Figure 4:
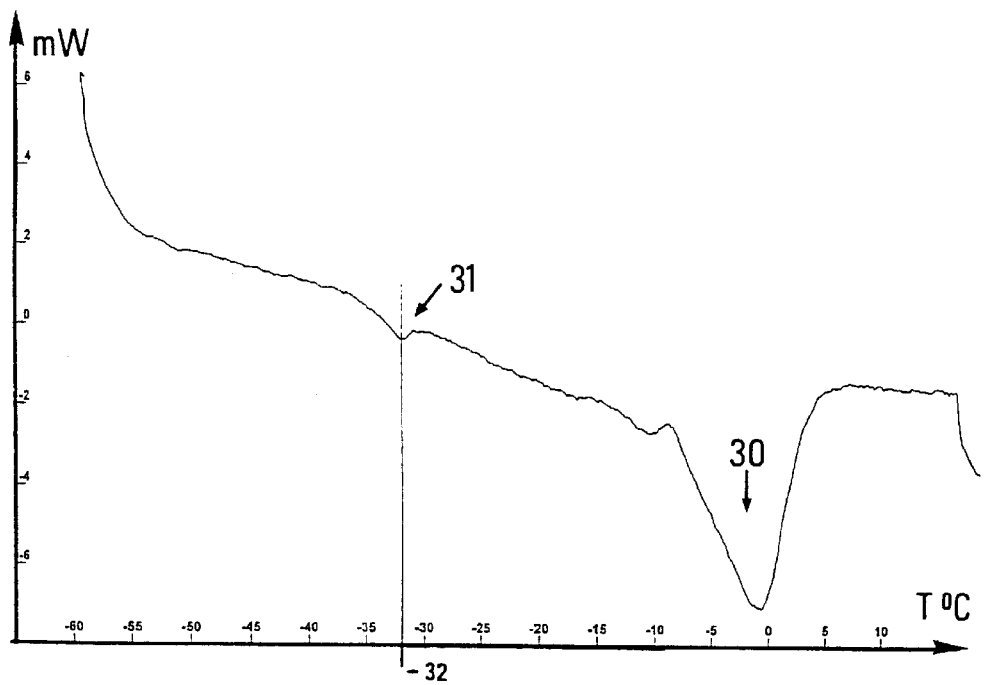
FIGS. 4 and 5 show two thermograms obtained on two drilling mud samples.

Determination of the methane hydrates dissociation temperature on an oil-base mud without weighting material at 75 bars (FIG. 4), the hydrate peak 30 is observed at about −1° C.; it is also possible to see a peak 31 at about −32° C., which corresponds to the melting of the ice contained in the water droplets.

Figure 5:
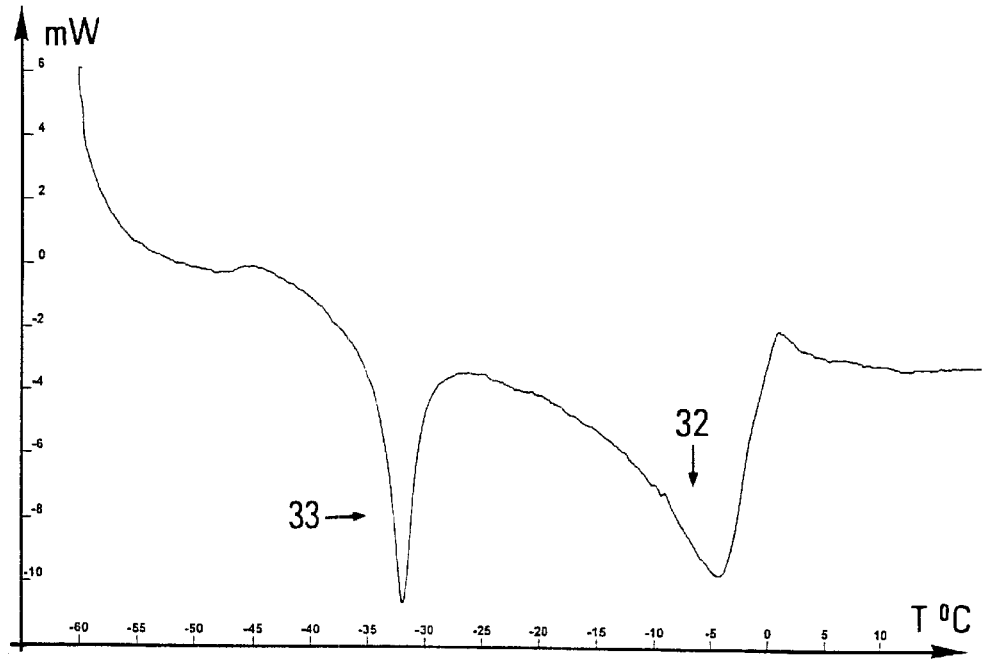

Determination of the methane hydrates dissociation temperature on a complete oil-base mud at 65 bars (FIG. 5), the hydrate peak 32 is observed at about −5° C.; it is also possible to see a great peak 33 at about −32° C. which also corresponds to the melting of the ice contained in the water droplets.

What is claimed is:

1. A method for determining gas hydrate formation conditions in a well fluid, comprising the following stages:
   taking a fluid sample,
   placing this sample in a calorimetry cell,
   performing on this sample a reference thermogram in a temperature range between T1 and T2,
   performing on the same sample a second thermogram in the same range and under a pressure Ph of a hydrocarbon gas, T1 being a temperature low enough to obtain the formation of hydrocarbon gas hydrates in the sample at a gas pressure Ph, T2 being high enough to obtain hydrate dissociation,
   identifying a peak in the second thermogram corresponding to the hydrocarbon gas hydrates dissociation zone and deducing therefrom a hydrocarbon gas hydrates dissociation temperature,
   determining the hydrocarbon gas hydrate formation conditions for the fluid considered.

2. A method as claimed in claim 1, wherein pressure Ph is determined as a function of the pressure of the well fluid close to the zones where the appearance of hydrocarbon gas hydrates is critical.

3. A method as claimed in claim 1, wherein the efficiency of an anti-hydrate additive is tested by adding it to said fluid sample in determined proportions.

4. A method as claimed in claim 1, wherein T1 and T2 are 20° C. and 35° C. respectively.

5. A method as claimed in claim 1, wherein the thermograms are obtained with a temperature gradient ranging between 0.5 and 5° C./minute, preferably at 2° C./minute.

6. A method as claimed in claim 1, wherein CH4 is used for said gas.

7. A system for implementing the method as claimed in claim 1, characterized in that it comprises in combination a calorimetric measuring device, means for placing the measuring cell of said device under pressure by means of a hydrocarbon gas, thermogram recording means.

* * * * *

(12) EX PARTE REEXAMINATION CERTIFICATE (8456th)
United States Patent
Dalmazzone et al.

(10) Number: US 6,571,604 C1
(45) Certificate Issued: Aug. 9, 2011

(54) METHOD AND DEVICE FOR EVALUATING DURING DRILLING THE CAPACITY OF WELL FLUIDS TO FORM HYDRATES

(75) Inventors: Christine Dalmazzone, Versailles (FR); Benjamin Herzhaft, Suresnes (FR); Annie Audibert, Croissy sur Seine (FR)

(73) Assignee: Institut Francais du Petrole, Rueil Malmaison Cedex (FR)

Reexamination Request:
No. 90/011,283, Oct. 15, 2010

Reexamination Certificate for:
Patent No.: 6,571,604
Issued: Jun. 3, 2003
Appl. No.: 10/066,644
Filed: Feb. 6, 2002

(51) Int. Cl.
*G01N 25/00* (2006.01)
*C01B 3/32* (2006.01)
*G01K 17/00* (2006.01)

(52) U.S. Cl. ............... 73/25.01; 48/127.5; 374/E17.001
(58) Field of Classification Search .................. 73/25.01
See application file for complete search history.

(56) References Cited
PUBLICATIONS

Dalmazzone et al., Differential Scanning Calorimetry: a New Technique to Characterize Hydrate Formation in Drilling Muds, Database Compendex 'en ligne! Proceedings 2000, XP002187246, Oct. 2000.

R.M. Ruff, Heat Capacity and Heat of Dissociation of Methane Hydrates, AICHE Journal, vol. 34, No. 9, 1988, pp. 1468–1476, XP–001051920, pp. 1466–1476.

C.A. Koh et al., A Dynamic Study of the Formation of Gas Clathrate Hydrates: In–Situ Synchrotron X–Ray Diffraction and Differential Scanning Calorimetry, Materials Science Forum, vol. 228–231, 1996, pp. 239–243.

J.S. Lievois et al., Development of an Automated, High Pressure Heat Flux Calorimeter and Its Application to Measure the Heat of Dissociation and Hydrate Numbers of Methane Hydrate, Fluid Phase Eqilibria, vol. 59, No. 1, 1990, pp. 73–97.

Search Report of Appln. 0101771000 dated Feb. 7, 2002 with partial translation.

*Primary Examiner*—Robert L Nasser

(57) ABSTRACT

Method of determining the gas hydrate formation conditions in a well fluid, comprising the following stages:
taking a fluid sample,
placing this sample in a calorimetry cell,
performing on this sample a reference thermogram in a temperature range between T1 and T2,
performing on the same sample a second thermogram in the same range and under a pressure Ph of a hydrocarbon gas, T1 being a temperature low enough to obtain the formation of hydrates in the sample at a gas pressure Ph, T2 being high enough to obtain hydrate dissociation,
identifying a peak in the second thermogram corresponding to the hydrates dissociation zone and deducting therefrom a hydrates dissociation temperature.

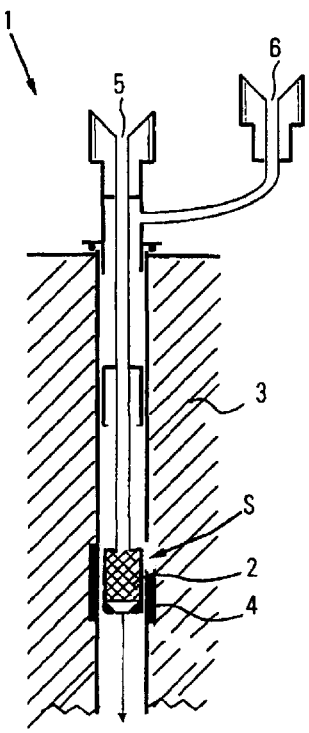

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3 and 5-7 is confirmed.

Claim 4 is determined to be patentable as amended.

New claims 8-34 are added and determined to be patentable.

4. A method as claimed in claim 1, wherein T1 and T2 are [20°] *−20°* C. and 35° C. respectively.

*8. A method as claimed in claim 2, wherein the efficiency of an anti-hydrate additive is tested by adding it to said fluid sample in determined proportions.*

*9. A method as claimed in claim 2, wherein T1 and T2 are −20° C. and 35° C. respectively.*

*10. A method as claimed in claim 2, wherein the thermograms are obtained with a temperature gradient ranging between 0.5 and 5° C./minute.*

*11. A method as claimed in claim 2, wherein the thermograms are obtained with a temperature gradient of 2° C./minute.*

*12. A method as claimed in claim 2, wherein CH4 is used for said gas.*

*13. A system for implementing the method as claimed in claim 2, characterized in that it comprises in combination a calorimetric measuring device, means for placing the measuring cell of said device under pressure by means of a hydrocarbon gas, and thermogram recording means.*

*14. A method as claimed in claim 2, wherein the fluid sample comprises an oil-base mud.*

*15. A method as claimed in claim 2, wherein the fluid sample comprises a water-base mud.*

*16. A method as claimed in claim 1, wherein the fluid sample comprises an oil-base mud.*

*17. A method as claimed in claim 1, wherein the fluid sample comprises a water-base mud.*

*18. A method as claimed in claim 1, wherein the fluid sample comprises a mud selected from the group consisting of an oil-base mud and a water-base mud.*

*19. A method as claimed in claim 18, wherein the efficiency of an anti-hydrate additive is tested by adding it to said fluid sample in determined proportions.*

*20. A method as claimed in claim 18, wherein T1 and T2 are −20° C. and 35° C. respectively.*

*21. A method as claimed in claim 18, wherein the thermograms are obtained with a temperature gradient ranging between 0.5 and 5° C./minute.*

*22. A method as claimed in claim 18, wherein the thermograms are obtained with a temperature gradient of 2° C./minute.*

*23. A method as claimed in claim 18, wherein CH4 is used for said gas.*

*24. A system for implementing the method as claimed in claim 18, characterized in that it comprises in combination a calorimetric measuring device, means for placing the measuring cell of said device under pressure by means of a hydrocarbon gas, and thermogram recording means.*

*25. A method for determining gas hydrate formation conditions in a well fluid, comprising the following stages:*

*taking a well fluid sample,*

*placing the well fluid sample in a calorimetry cell,*

*performing on the well fluid sample a reference thermogram in a temperature range between T1 and T2 and under an atmospheric pressure or neutral gas pressure,*

*performing on the same well fluid sample a second thermogram in the same range and under a pressure Ph of a hydrocarbon gas, T1 being a temperature low enough to obtain the formation of hydrocarbon gas hydrates in the well fluid sample at a gas pressure Ph, and T2 being high enough to obtain hydrate dissociation,*

*identifying a peak in the second thermogram, in a zone where the reference thermogram comprises none, corresponding to the hydrocarbon gas hydrates dissociation zone and deducing therefrom a hydrocarbon gas hydrates dissociation temperature, and*

*determining the hydrocarbon gas hydrate formation conditions for the well fluid considered.*

*26. A method as claimed in claim 25, wherein pressure Ph is determined as a function of the pressure of the well fluid close to the zones where the appearance of hydrocarbon gas hydrates is critical.*

*27. A method as claimed in claim 25, wherein the efficiency of an anti-hydrate additive is tested by adding it to said well fluid sample in determined proportions.*

*28. A method as claimed in claim 25, wherein T1 and T2 are −20° C. and 35° C. respectively.*

*29. A method as claimed in claim 25, wherein the thermograms are obtained with a temperature gradient ranging between 0.5 and 5° C./minute.*

*30. A method as claimed in claim 25, wherein the thermograms are obtained with a temperature gradient of 2° C./minute.*

*31. A method as claimed in claim 25, wherein CH4 is used for said gas.*

*32. A method as claimed in claim 25, wherein the well fluid sample comprises an oil-base mud.*

*33. A method as claimed in claim 25, wherein the well fluid sample comprises a water-base mud.*

*34. A system for implementing the method as claimed in claim 25, characterized in that it comprises in combination a calorimetric measuring device, means for placing the measuring cell of said device under pressure by means of a hydrocarbon gas, and thermogram recording means.*

* * * * *